(12) United States Patent
Makino et al.

(10) Patent No.: US 7,040,962 B2
(45) Date of Patent: May 9, 2006

(54) ICE BLASTING APPARATUS AND TRIMMING METHOD FOR FILM INSERT MOLDING

(75) Inventors: Shinichi Makino, Mishima (JP); Naokatsu Kojima, Nagaizumi-cho (JP)

(73) Assignee: Fuji Seiki Machine Works, Ltd., Shizuoka-Pref. (JP)

( * ) Notice: Subject to any disclaimer, the term of this patent is extended or adjusted under 35 U.S.C. 154(b) by 0 days.

(21) Appl. No.: 10/988,339

(22) Filed: Nov. 12, 2004

(65) Prior Publication Data

US 2005/0107006 A1    May 19, 2005

(30) Foreign Application Priority Data

Nov. 19, 2003  (JP) ............................... 2003-388786
Nov. 19, 2003  (JP) ............................... 2003-388787

(51) Int. Cl.
*B24C 1/04* (2006.01)
(52) U.S. Cl. .............................. 451/39; 451/53; 451/99
(58) Field of Classification Search .................. 451/38, 451/39, 40, 53, 99, 101, 90, 75
See application file for complete search history.

(56) References Cited

U.S. PATENT DOCUMENTS

| | | | | |
|---|---|---|---|---|
| 2,063,770 A | * | 12/1936 | Taylor | .......................... 62/346 |
| 2,749,722 A | * | 6/1956 | Knowles | ....................... 62/346 |
| 3,403,532 A | * | 10/1968 | Knowles | ....................... 62/347 |
| 3,676,963 A | * | 7/1972 | Rice et al. | ..................... 451/39 |
| 5,623,831 A | * | 4/1997 | Mesher | .......................... 62/71 |
| 5,895,313 A | * | 4/1999 | Ikezaki et al. | ................. 451/38 |
| 5,913,711 A | * | 6/1999 | Visaisouk | ..................... 451/39 |
| 6,328,631 B1 | * | 12/2001 | Fukano et al. | ................. 451/39 |

* cited by examiner

*Primary Examiner*—Robert A. Rose
(74) *Attorney, Agent, or Firm*—Flynn, Thiel, Boutell & Tanis, P.C.

(57) ABSTRACT

An ice blasting apparatus comprises: an ice making device operating a cutting blade to shave off ice freezing on an inner wall of the freezing casing and continuously discharges the shaved ice as flake-shaped ice pellets; an ice mixing tank mixing the ice pellets and water and maintaining the resulting ice slurry at a predetermined concentration with a concentration sensor; and a blast gun blasting the ice slurry. A trimming method is performed on a film insert molding with a film material adhering to a face of a resin molding and extending beyond a periphery edge of the resin molding. A blast gun facing the face with the film adhering to it blasts ice slurry of a required concentration toward the vicinity of the periphery edge of the resin molding to remove the unnecessary portion of the film material extending beyond the periphery edge of the resin molding.

12 Claims, 7 Drawing Sheets

ICE BLASTING APPARATUS AND TRIMMING METHOD FOR FILM INSERT MOLDING

BACKGROUND OF THE INVENTION

1. Field of the Invention

This invention relates to a technique associated with an ice blasting process, more particularly, an apparatus for producing and ejecting ice pellets, and a method of using ice blasting to perform the finishing process on film-insert injection moldings.

2. Description of the Related Art

Ice blasting apparatus using slurry that includes a mixture of ice pellets and water as an emitted material does not use any abrasive, and therefore does not cause any damage to articles undergoing the blasting process. Further, the ice blasting apparatus has no abrasive residues left after the completion of the blasting process and thus is in no need of a disposal process for liquid wastes that includes an abrasive. For these reasons, such ice blasting apparatuses have captured much of the spotlight as next-generation blasting apparatuses, and are being assiduously developed for eventual commercialization.

Ice blasting is an epoch-making technique having various advantages. Because of a great problem involved in commercialization, ice blasting falls short of completely replacing conventional dry blasting and wet blasting using abrasives. More specifically, ice blasting uses ice pellets instead of abrasives. Hence, although it goes without saying that definitive methods for producing and supplying ice pellets are of significant importance, there is a considerably difficult problem in implementing the stable producing and supplying of the ice pellets at low cost from a practical point of view, aside from the theory. In other words, unlike usual abrasives, ice pellets have the unstable property of being incapable of keeping their form at room temperature, making stocking unfeasible. Therefore, ice pellets must be continuously supplied to a blast gun while being produced. A high technique is necessary to continue to stably and continuously produce and supply ice pellets of the form best suited for the emitted material, which in turn requires high costs.

In order to finish a surface of a molding with a required accuracy by the use of ice blasting, the concentrations of ice slurry blasted from a blast gun need to be set precisely. If the concentrations are not properly controlled, there is not even the remotest possibility of yielding satisfactory result of the blasting process. In other words, because the ice blasting apparatus uses as a material melting-prone and unstable ice, there is a need of concentration control with a far higher degree of precision than that in conventional blasting apparatuses that use a material of significantly stable properties as an abrasive.

As described above, a requirement for implementing the effective ice blasting process is combined operation between an ice making device capable of stably producing and supplying ice pellets with high accuracy and an ice mixing tank capable of stably producing and supplying ice slurry of a properly controlled concentration in accordance with the ice pellets supplied thereto. Up to now, however, it has been virtually impossible to find an ice blasting apparatus using such an ice making device and an ice mixing tank, which has been perfected so as to be capable of giving a high degree of satisfaction from all aspects.

When it comes to the film insert molding, this is composed of a resin molding and a film material integrally adhering to the surface of the resin molding. To manufacture the film insert molding, a film material made of acrylic resin or the like is laid inside a cavity of an injection mold. Then, the injection mold is closed and molten resin such as polypropylene or the like is injected into the cavity of the injection mold. The resulting film insert molding is adopted widely for interior vehicle components such as a console, a center cluster and a switch base, parts of various household electric appliances (e.g. the display panel of a refrigerator, a washing machine or the like), various furnishings, and various building materials such as wallboards and pillars.

As illustrated in the perspective view of FIG. 2 and the sectional view of FIG. 3 which is taken along the A—A line in FIG. 2, in the film insert molding immediately after being removed from the injection mold, a film material 32 is adhering to a resin molding 31 with extending beyond the outer periphery edge and the inner periphery edge of the resin molding 31. For final completion of the film insert molding, a process is required for trimming the unnecessary extending portion 39.

This process is typically performed by manual work in which an operator cuts off the extending portion 39 gently by use of a box cutter. The resin molding often has a complicated peripheral shape. Further, the film material 32 is soft and unsteady. Hence, paying close attention is required for the cutting process using a box cutter. Time and effort are naturally required, which in turn makes bulk handling in a short time impossible. Further, the resin molding 31 and/or the film material 32 integrally adhering to the surface of the resin molding 31 may be damaged during the cutting process. Many defective products are produced, making shipment impossible.

Under the circumstances, in one case an attempt is made to immerse the resin molding 31 with the unnecessary extending portion 39 in liquid nitrogen in order for the extending portion 39 to be chilled to an extreme low temperature to freeze and weaken, and then for the frozen extending portion 39 to be crushed for removal. However, this attempt has not yet been successfully put into actual use because of the high cost required for facilities and the overstressing of the resin molding 31.

In another case, an attempt is made to crush the extending portion 39 for removal by the use of a process of directing a dry blast of an abrasive toward the resin molding 31 by high pressure gas or a process of directing a wet blast of slurry having an abrasive suspended in fluid toward the resin molding 31. This attempt has met with some success. However, an abrasive is used as the emitted material in the dry blasting and the wet blasting. Hence, it is inevitable that the surface of the film material 32 is damaged and roughened to varying degrees when the abrasive comes into collision with the surface of the film material 32.

Some of various products in fact have a wide allowable range of a somewhat roughened surface of the film material 32. However, in the case of relatively high quality products such as an interior vehicle component composed of the resin molding 31 and a woodgrain-pattern printed film or a very smooth, glossy film adhering integrally to the surface of the resin molding 31, a roughened surface of the film material is undesirable. In view of this, there is hesitation over using the dry blasting and the wet blasting processes. As described hitherto, a blasting process is not able to be used as the finishing process for various resin moldings, particularly, a film insert molding, resulting in hindrance to any improvement in working efficiency.

BRIEF SUMMARY OF THE INVENTION

It is an object of the present invention to provide a blast apparatus capable of enduring continuous operation for long time and stably and accurately supplying ice slurry of an exact concentration, and a method allowing speedy trimming with safety and reliability without any damage to a surface of a film material when a unnecessary portion of the film material is removed from a film insert molding.

An ice blasting apparatus according to the present invention comprises an ice making device 1, an ice mixing tank 2 and a blast gun 11. The ice making device 1 comprises a cylindrical-shaped freezing casing 20 to an outer periphery of which an evaporator having a refrigerating catalyst circulated therein is attached, and which receives a supply of water; and an auger screw 24 that is axially supported rotatably inside the freezing casing 20 and has a cutting blade 23 of a helical shape with an outer diameter slightly smaller than an inner diameter of the freezing casing 20. The ice making device 1 operates the cutting blade 23 to shave off ice which is frozen on an inner wall face of the freezing casing 20 by action of the refrigerating catalyst, and continuously discharges the shaved ice as flake-shaped ice pellets 25. The ice mixing tank 2 receives the flake-shaped ice pellets 25 from the ice making device 1 and water 26 from a water feed pipe 5, and mixes uniformly the ice pellets 25 and the water 26 with an agitating propeller 17 that is suspended inside the ice mixing tank 2. The ice mixing tank 2 has an ice-slurry concentration sensor 14 mounted thereon in order to measure concentrations of ice slurry 27 inside the ice mixing tank 2 at all times for maintaining a predetermined concentration. The blast gun 11 blasts the proper concentration of ice slurry 27 delivered from the ice mixing tank 2, toward a surface of an article subject to blasting.

Further, a method of finishing a film insert injection molding according to the present invention is based on a technique in which, for a film insert molding that is removed from an injection mold and has a film material 32 of the film insert molding adhering integrally to a face of a resin molding 31 of the film insert molding and extending beyond a periphery edge of the resin molding 31, a blast gun 11 is placed facing the face of the resin molding 31 with the film material 32 adhering to it and blasts ice slurry 27 of a required concentration toward the vicinity of the periphery edge of the resin molding 31 in order for the impact of the ice slurry 27 to separate and remove an unnecessary portion of the film material 32 extending beyond the periphery edge of the resin molding 31.

DETAILED DESCRIPTION OF THE INVENTION

Figure 1:
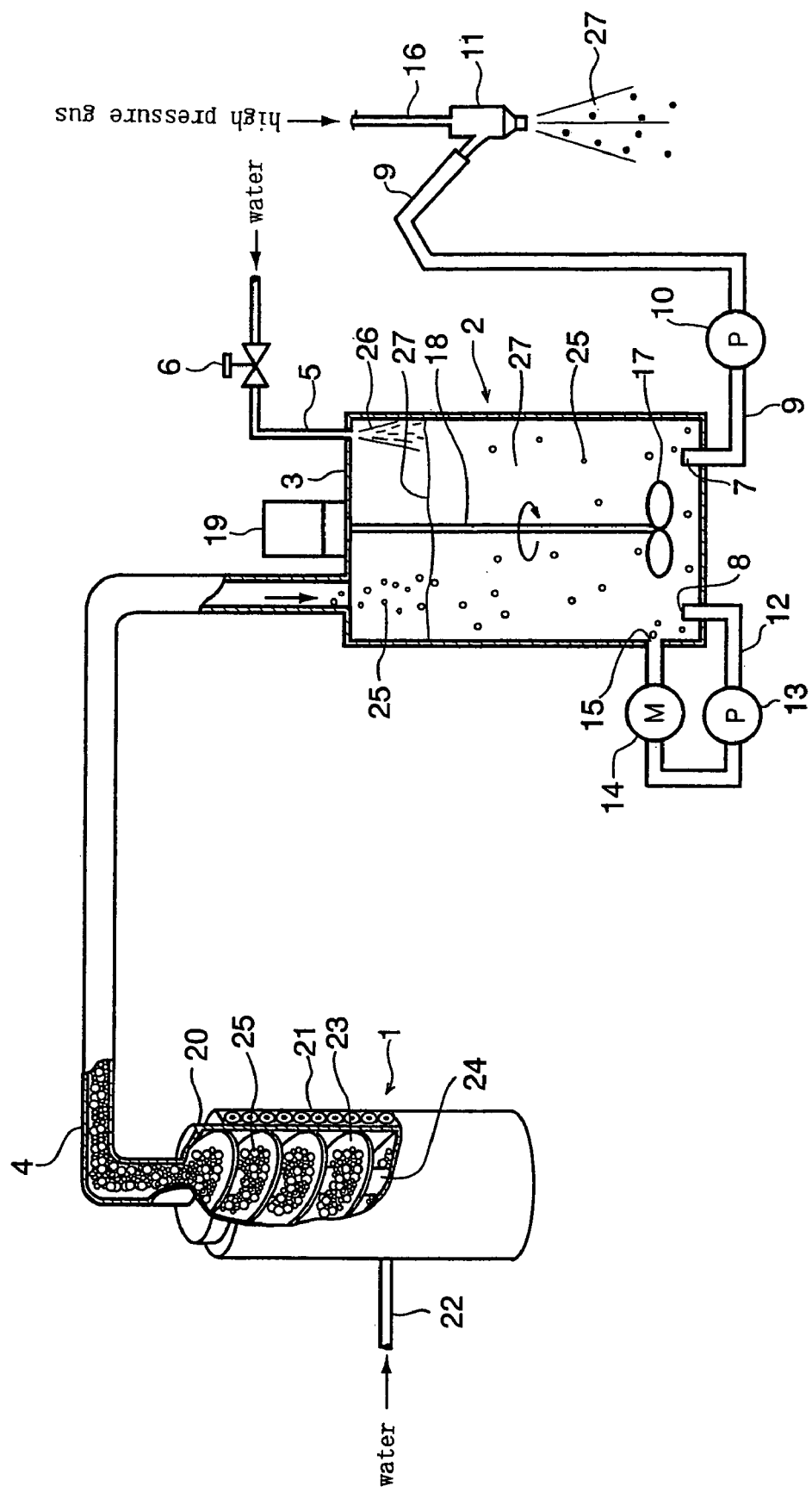
FIG. 1 is a partially sectional view illustrating the schematic structure of an ice blasting apparatus according to the present invention.
Figure 2:
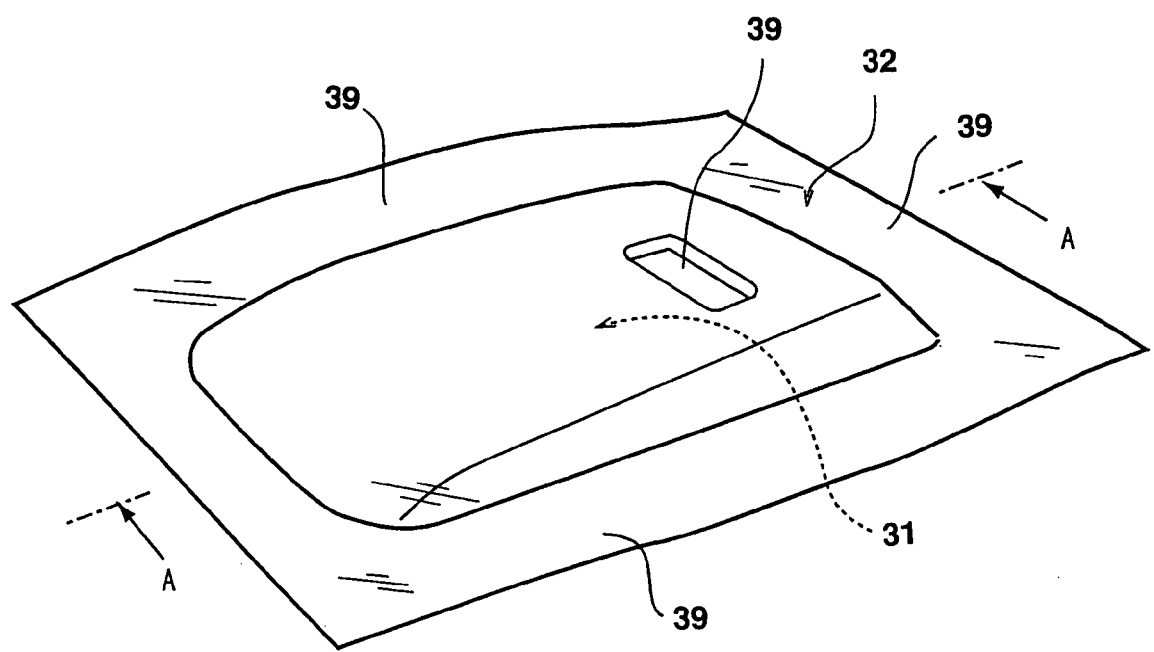
FIG. 2 is a perspective view of an example of a film insert molding immediately after being removed from an injection mold.
Figure 3:
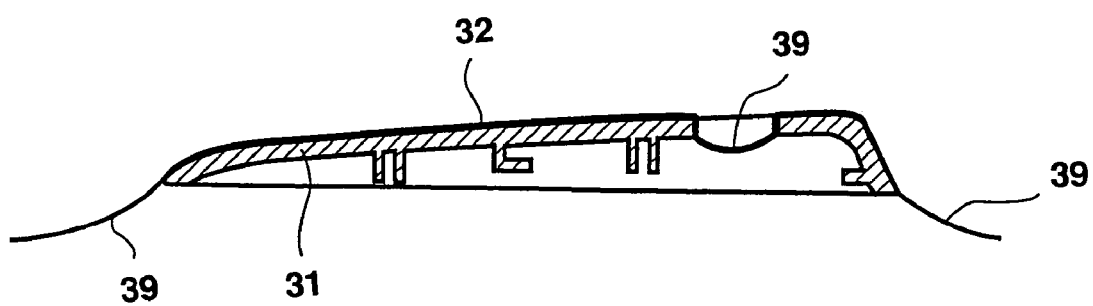
FIG. 3 is a sectional view taken along the A—A line in FIG. 2.

A preferred embodiment of an ice blasting apparatus according to the present invention will be described below with reference to the accompanying drawings. FIG. 1 shows an ice making device 1 and an ice mixing tank 2. Reference numeral 20 in FIG. 1 denotes a cylindrical-shaped freezing casing forming a main part of the ice making device 1. A freezing evaporator 21 in which a refrigerating catalyst is circulated is attached on the outer periphery face of the freezing casing 20. Water which is raw material of ice is supplied into the freezing casing 20 through a water feed pipe 22. An auger screw 24 is axially supported inside the freezing casing 20. The auger screw 24 has a cutting blade 23 of a helical shape with an outer diameter slightly smaller than the inner diameter of the freezing casing 20. The auger screw 24 is rotationally moved by a drive source (not shown), so that the cutting blade 23 successively shaves off the ice that is frozen on the inner wall face of the freezing casing 20 by the action of the refrigerating catalyst which circulates inside the evaporator 21. The shaved ice is continuously discharged as flake-shaped ice pellets from an ice-pellet feed pipe 4 provided in an upper portion of the freezing casing 20.

The ice mixing tank 2 is formed in a closed-end cylinder shape having the top covered with a lid 3. The ice-pellet feed pipe 4 and a water feed pipe 5 are attached to the lid 3. An electromagnetic valve 6 for opening/closing the pipe is provided at some midpoint in the water feed pipe 5. A pair of ice-slurry outlets 7 and 8 is formed in the bottom end of the ice mixing tank 2. The ice-slurry outlet 7 is connected to one end of an ice-slurry supply pipe 9. The other end of the ice-slurry supply pipe 9 is connected to a blast gun 11 via an ice-slurry pump 10. The blast gun 11 is further connected to a compressed-air supply pipe 16 supplying compressed air.

The ice-slurry outlet 8 is connected to an ice-slurry circulation pipe 12. The ice-slurry circulation pipe 12 is then connected through an ice-slurry circulating pump 13 and an ice-slurry concentration monitor 14 to an ice-slurry return port 15 that is formed in a lower portion of the periphery wall of the ice mixing tank 2.

FIG. 1 further shows an agitating propeller 17 suspended downward into a lower portion of the ice mixing tank 2. The agitating propeller 17 is connected via a rotating shaft 18 to a rotating shaft of a drive motor 19 provided on the lid 3.

The embodiment has the structure described above. Water which is the raw material of ice is dispersed across the inner wall face of the freezing casing 20 of the ice making device 1, and the refrigerating catalyst is circulated in the evaporator 21. Thereupon, the water dispersed across the inner wall face of the freezing casing 20 freezes gradually to form a thin layer of ice. The auger screw 24 is constantly rotated in the freezing casing 20, so that the ice formed on the inner wall face of the freezing casing 20 is shaved off into flake form and moved upward by the cutting blade 23 of the auger screw 24. The resulting flake-shaped ice pellets 25 are continuously supplied to the ice-pellet feed pipe 4 provided in the upper portion of the freezing casing 20.

Into the ice mixing tank 2 water 26 is supplied from the water feed pipe 5 by opening the electromagnetic valve 6 while the flake-shaped ice pellets 25 are supplied from the ice-pellet feed pipe 4. It goes without saying that the water 26 supplied is preferably cold water.

The water 26 and the ice pellets 25 are stirred and mixed together in the ice mixing tank 2 by the rotation of the agitating propeller 17 to form ice slurry 27. The ice slurry 27 is moved downward in the ice mixing tank 2 by a downward stream produced by the rotation of the agitating propeller 17, to flow from the ice-slurry outlet 7 into the ice-slurry supply pipe 9. The ice slurry 27 is then blasted at high speed from the nozzle of the blast gun 11 toward the surface of an article subject to processing, such as for trimming for a film insert molding manufactured by the injection molding process, for various surface treatments, and other various processes for cleaning, deburring, descaling, peening and the like.

Meanwhile, in the ice mixing tank 2, a portion of the ice slurry 27 flows from the ice-slurry outlet 8 into the ice-slurry circulation pipe 12, and is delivered to the ice-slurry concentration monitor 14. After the concentration of the ice slurry 27 is measured in the concentration monitor 14, the ice slurry 27 is returned to the ice mixing tank 2 from the ice-slurry return port 15. If the ice-slurry concentration monitor 14 detects that the concentration of the ice pellets 25 is lower than the set value, the amount of the ice pellets 25 supplied from the ice-pellet feed pipe 4 is increased. If the concentration monitor 14 detects that the concentration of the ice pellets 25 is higher than the set value, the electromagnetic valve 6 is opened to increase the amount of the water 26 supplied from the water feed pipe 5. Thereby, the ice-slurry concentration is maintained constant at all times.

As described hitherto, the ice pellets formed in a flake shape which is best suited for use in ice blasting are continuously produced in the ice making device 1 and supplied to the ice mixing tank 2. In the ice mixing tank 2 the concentration of the ice slurry 27 is maintained at the set value at all times. In consequence, it is possible to continuously perform the ice blasting process on the article surface over a long time. The present invention is effective in performing various surface treatments, cleaning, deburring, descaling and the like, and more particularly, trimming for a film insert molding produced by the injection molding process as described below.

Figure 4:
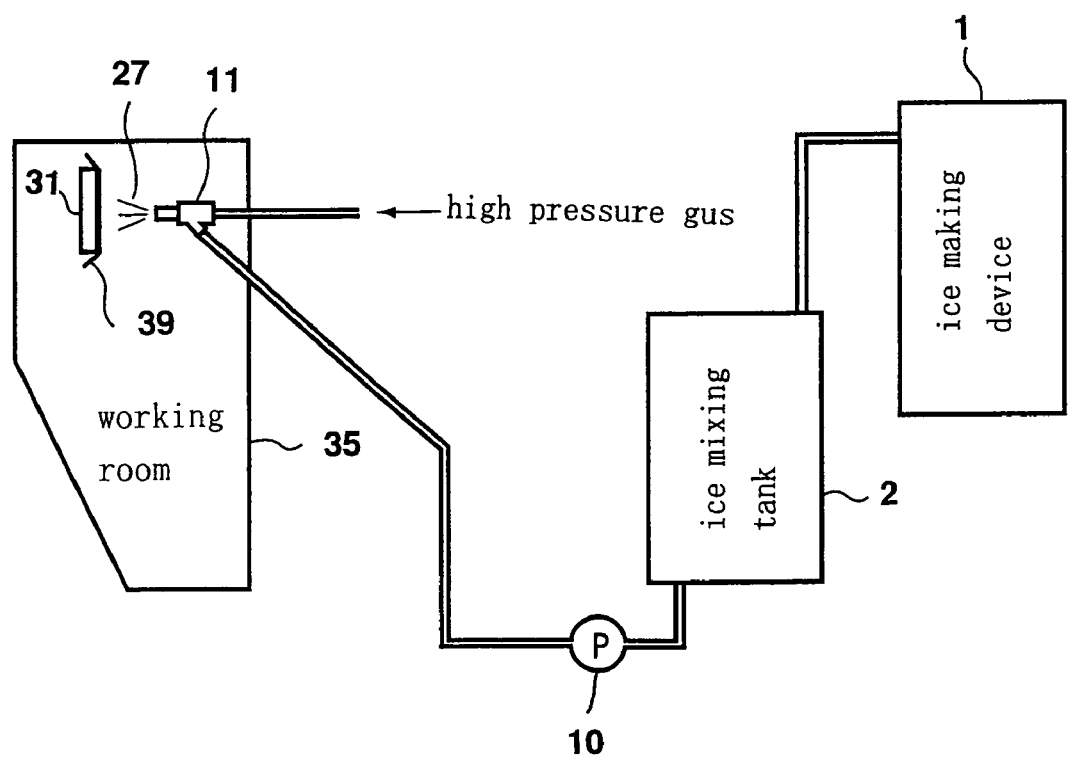
FIG. 4 is a conceptual diagram of an example of an apparatus used in a trimming method for a film insert molding according to the present invention.

Next, a preferred embodiment of a trimming method for the film insert molding according to the present invention will be described. FIG. 4 illustrates an example of an apparatus used in the trimming method for the film insert molding according to the present invention. FIG. 4 shows an ice making device 1 and an ice mixing tank 2. Flake-shaped ice pellets produced by the ice making device 1 are continuously supplied to the ice mixing tank 2 and mixed with water to from ice slurry 27 of a predetermined concentration in the ice mixing tank 2. The ice slurry 27 is sent by a pump 10 to a blast gun 11 placed in a working room 35. The above ice making device 1 and the above ice mixing tank 2 may differ in structure from the ice making device 1 and the ice mixing tank 2 that have been described in the foregoing ice blasting apparatus in FIG. 1. However, if the ice making device 1 and the ice mixing tank 2 as described in FIG. 1 are used for implementing the trimming method described in this embodiment, it is possible to obtain the optimum effect.

Figure 5:
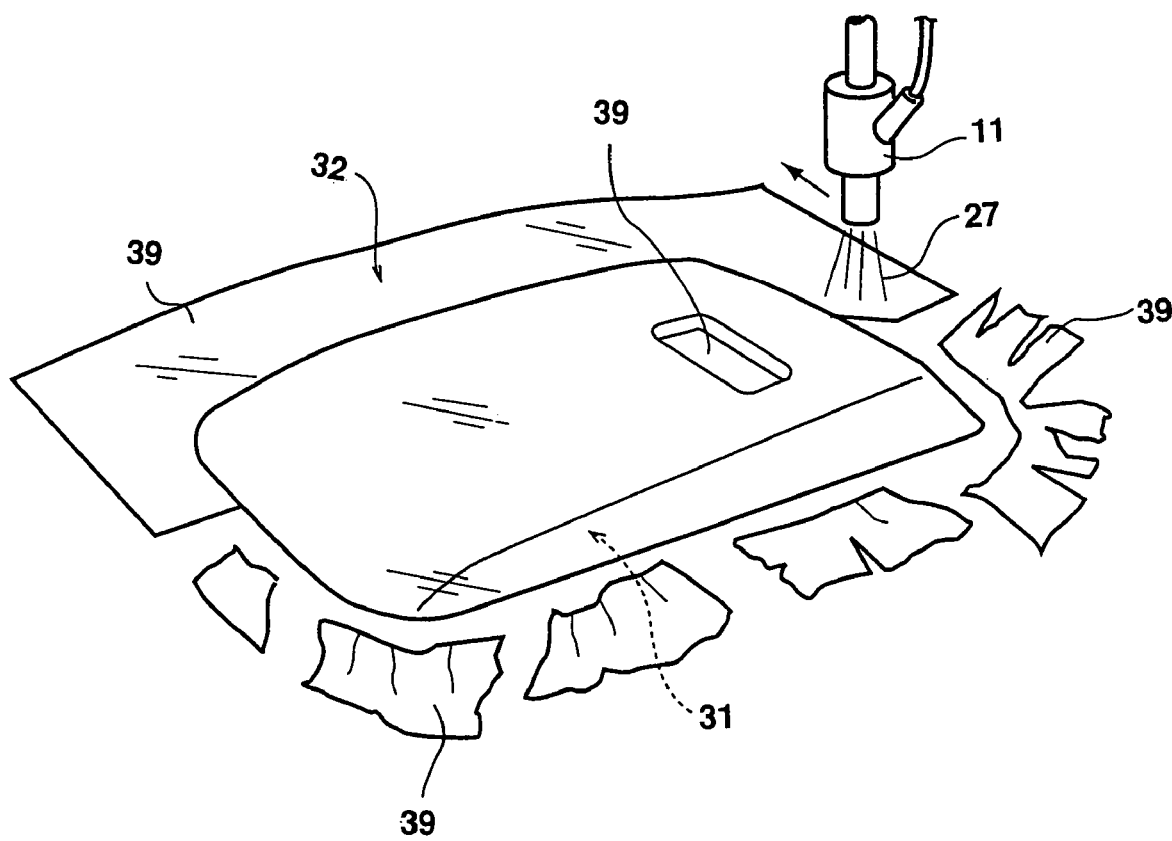
FIG. 5 is a perspective view illustrating a film insert molding under a trimming process using the apparatus shown in FIG. 4.
Figure 6:
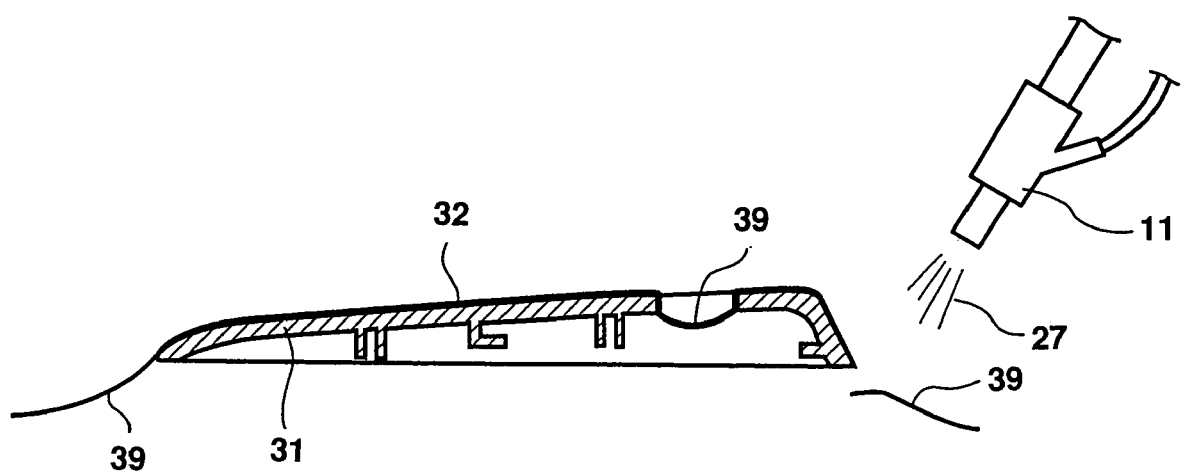
FIG. 6 is a sectional view of the film insert molding shown in FIG. 5.
Figure 7:
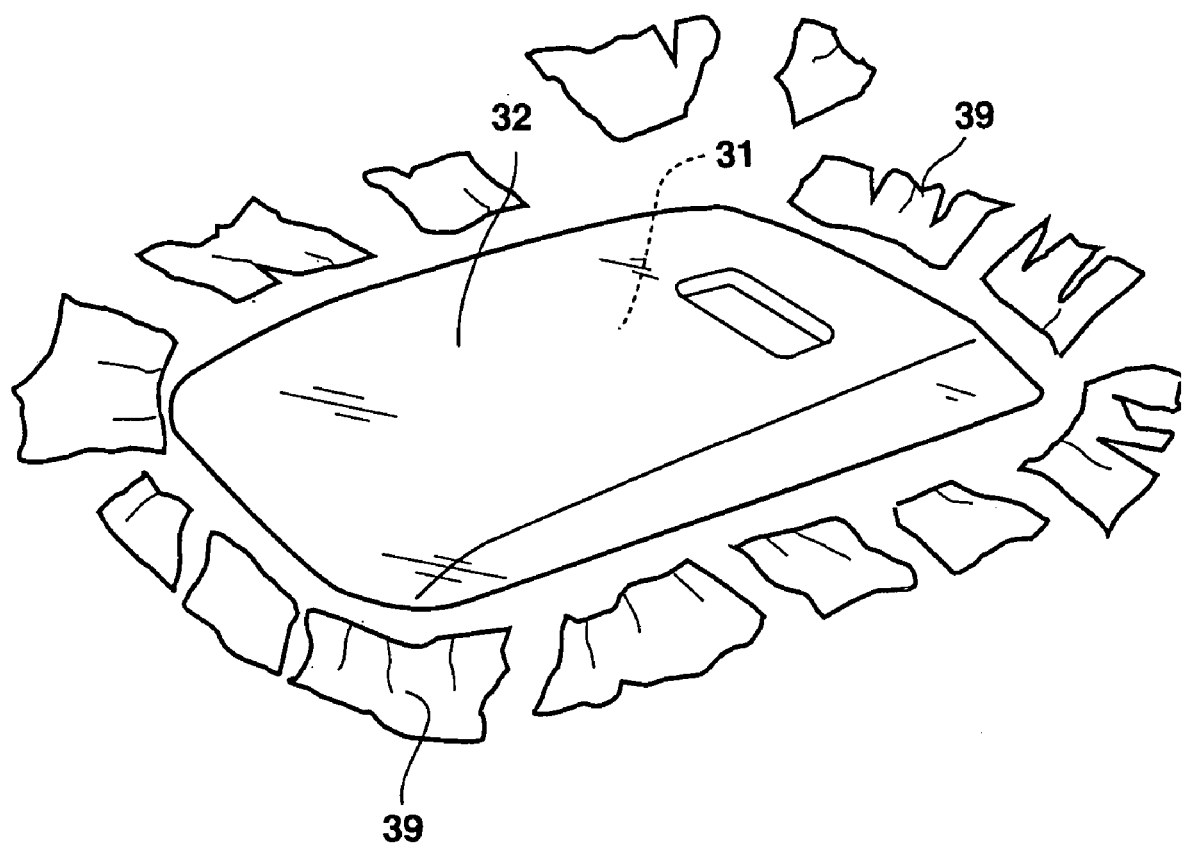
FIG. 7 is a perspective view of the film insert molding after the trimming process.

In the working room 35, as illustrated in FIGS. 5 and 6, the blast gun 11 faces toward the face of a film insert molding with a film material 32 adhering integrally to a resin molding 32, and the ice slurry 27 is blasted from the blast gun 11 toward the peripheral edge of the resin molding 31 and an extending portion 39 of the film material 32. Thereupon, by the impact resulting from the collisions of the ice pellets, the extending portion of the film material 32 to which the ice slurry 27 is blasted is broken off bit by bit to be separated from the resin molding 31, so that the peripheral edge of the resin molding 31 is exposed. Thus, by continuing this process as the blast gun 11 is moved sequentially along the peripheral edge of the resin molding 31, the unnecessary extending portion 39 of the film material 32 is separated and removed neatly from the entire outer peripheral edge and the entire inner peripheral edge of the resin molding 31. The blast gun 11 may be held and moved by the use of a robot as well as by hand operation. FIG. 7 is a plan view of the film insert molding after the trimming process has been completed in this manner. After the completion of the processing, in the event that the cut side of the film material 32 is somewhat jagged, this jagged edge can be easily cut off by a box cutter.

Experiments by the inventors of the present invention revealed that, in the trimming process for a film insert molding in which an acrylic resin-made film material 32 approximately 0.2 mm thick is adhering integrally to a polypropylene-made resin molding 31, the air pressure of the blast gun 11 preferably ranges from about 0.3 to about 0.8 MPa, the most preferable being about 0.7 MPa; the processing distance between the nozzle leading end of the blast gun 11 and the surface of the resin molding 31 which is an article subject to processing preferably ranges from 20 to 80 mm, the most preferable being about 40 mm; viewed as a virtual volume concentration resulting from visual measurement of the amount of ice floating in a 1-liter measuring cylinder within a predetermined time period, the concentration of the ice slurry 27 preferably ranges from 20 to 60%, the most preferable being about 40%; and the processing speed preferably ranges from 10 to 70 mm/sec. It is needless to say that those values may vary depending on the thickness of quality of the film material 32, the shape of the resin molding, the area for blasting, and the like.

The face of the film material 32 after the collision of the ice slurry 27 has been inspected in detail with a microscope. As a result of this inspection, it has been found that the surface has no damage produced by the collision and is not roughened. It goes without saying that because the ice slurry 27 does not include any abrasive, no process is required for cleaning the film insert molding which is an article subject to processing to remove any abrasive therefrom after the completion of the trimming process.

EFFECT OF THE INVENTION

In an ice blasting apparatus according to the present invention, flake-shaped ice pellets 25 which are continuously produced in an ice making device 1 are used as the raw material of ice slurry 27. Therefore, the ice blasting apparatus needs no process for slicing ice with an ice-cutting apparatus as performed in the case of ice cubes, and is capable of continuously supplying the ice pellets to an ice mixing tank 2 without any additional processing. Further, in the ice mixing tank 2, the concentration of the ice slurry 27 is automatically maintained at a proper value at all times by the use of an ice-slurry concentration monitor 14. For this reason, the ice slurry 27 of properties best suited for blasting an article subject to processing is blasted from the blast gun 11. Thus, without damaging the surface of the article subject to blasting, it is possible to successfully perform the trimming for a film insert molding, various surface treatments, and other various processes for cleaning, deburring, descaling, peening and the like. Further, because no abrasive residues are left on the surface of the article subject to blasting, there is no need of a cleaning process for the surface of the article and a disposal process for liquid wastes that include an abrasive.

In a trimming method for a film insert molding according to the present invention, because the trimming process for the film insert molding is performed by the use of ice blasting, there is no damage to the film material 32 adhering integrally to the surface of the resin molding 31. Hence, the trimming method best suits a trimming process for high quality products such as a wood grain-pattern vehicle interior component. There is no possibility of abrasive residues being left in a sunken area and a corner portion of the resin molding 31 and the like, and no need of a cleaning process and a disposal process for liquid wastes. From these viewpoints, the trimming method has the effect that a high quality trimming process can be efficiently performed with high accuracy at low cost.

What is claimed is:

1. A trimming method for a film insert injection molding comprising the steps of:
    removing a film insert molding from an injection mold, the film insert molding comprising a resin molding and a soft film material having a supported portion adhering integrally to a face of the resin molding, the film material further having an unsupported extending portion extending beyond a peripheral edge of the resin molding;
    aligning a blast gun with the peripheral edge of the resin molding;
    supplying an ice slurry to said blast gun;
    blasting a predetermined concentration of the ice slurry toward a vicinity of the peripheral edge of the resin molding with said blast gun; and
    moving said blast gun about the peripheral edge of the resin molding during said blasting of said ice slurry in order to separate and remove the unsupported extending portion of the film material extending beyond the peripheral edge of the resin molding by said ice slurry, wherein the peripheral edge of the resin molding supports and prevents damage to the supported portion of the film material during the blasting step, and the unsupported portion is separated from the supported portion along the peripheral edge by the blasting step.

2. The trimming method for a film insert injection molding of claim 1, comprising the steps of:
    providing the injection mold having a cavity;
    placing the film material into the cavity of the injection mold;
    closing the injection mold; and
    injecting a molten resin into the cavity of the injection mold to form the film insert molding.

3. The trimming method for a film insert injection molding of claim 1, comprising the steps of:
    providing a freezing casing having an inner wall face with an evaporator attached to an outer periphery thereof;
    providing a refrigerating catalyst for circulation in the evaporator;
    providing an auger that is axially supported rotatably inside the freezing casing, the auger including a cutting blade with an outer diameter slightly smaller than an inner diameter of the freezing casing; and
    operating the auger such that the cutting blade shaves ice frozen to the inner wall face of the freezing case, wherein said ice is provided as ice pellets for the ice slurry.

4. The trimming method for a film insert injection molding of claim 3, comprising the steps of:
    providing an ice mixing tank having an agitating propeller;
    providing the ice pellets to the ice mixing tank wherein the ice pellets are flake shaped;
    providing water from a water feed pipe to the ice mixing tank;
    mixing the ice pellets and the water to form the ice slurry; and
    feeding the ice slurry to supply the blast gun.

5. The trimming method for a film insert injection molding of claim 4, further comprising the step of providing an ice-slurry concentration sensor to measure concentrations of ice in the ice slurry inside the ice mixing tank.

6. The trimming method for a film insert injection molding of claim 1, further comprising the step of providing an ice-slurry concentration sensor to measure concentrations of ice in the ice slurry to maintain a predetermined concentration for feeding to the blast gun to effect separation of the unsupported portion from the supported portion.

7. The trimming method for a film insert injection molding of claim 1, wherein the peripheral edge of the resin molding comprises an outer peripheral edge and the resin molding of the film insert molding includes an aperture defined by an inner peripheral edge that is closed by the film material, the method further comprising the steps of:
    aligning the blast gun with the inner peripheral edge of the resin molding;
    blasting a predetermined concentration of ice slurry from the blast gun towards a vicinity of the inner peripheral edge of the resin molding; and
    moving the blast gun sequentially along the inner peripheral edge of the resin molding in order to separate and remove the entire portion of the film material covering the aperture of the resin molding to form the aperture as an open bore aperture.

8. A trimming method for a film insert injection molding comprising the steps of:
    providing an injection mold having a cavity;
    inserting a soft film material into the cavity of the injection mold;
    closing the injection mold;
    injecting a molten resin into the cavity of the injection mold which defines a resin molding, wherein said soft film material and said resin molding define a film insert molding;
    removing the film insert molding from the injection mold, the film insert molding comprising a supported portion of the soft film material adhering integrally to a face of the resin molding, the film material further having an unsupported extending portion extending beyond an outer peripheral edge which extends about the entirety of the resin molding;
    providing an ice mixing tank storing an ice slurry, the ice mixing tank being connected to provide the ice slurry to a blast gun;
    aligning the blast gun with the outer peripheral edge of the resin molding;
    blasting a predetermined concentration of ice slurry from the blast gun towards a vicinity of the outer peripheral edge of the resin molding; and
    moving the blast gun sequentially along the outer peripheral edge of the resin molding in order to separate and remove the unsupported extending portion of the soft film material extending beyond the outer peripheral edge of the resin molding, wherein the outer peripheral edge of the resin molding supports and prevents damage to the supported portion of the film material during the blasting step, and the unsupported portion is separated from the supported portion along the peripheral edge by the blasting step.

9. The trimming method for a film insert injection molding of claim 8, wherein the resin molding of the film insert molding includes an aperture defined by an inner peripheral edge that is closed by the film material, the method further comprising the steps of:

aligning the blast gun with the inner peripheral edge of the resin molding;

blasting a predetermined concentration of ice slurry from the blast gun towards a vicinity of the inner peripheral edge of the resin molding; and moving the blast gun sequentially along the inner peripheral edge of the resin molding in order to separate and remove the entire portion of the film material covering the aperture to form the aperture as an open bore aperture.

10. The trimming method for a film insert injection molding of claim 8, including a step of spacing the blasting gun a distance from 20 mm to 80 mm from the surface of the resin molding, and wherein the step of blasting a predetermined concentration of ice slurry comprises blasting the ice slurry at a pressure of from about 0.3 MPa to about 0.8 MPa.

11. The trimming method for a film insert injection molding of claim 8, including the step of maintaining the concentration of ice in the ice slurry in a range of 20% to 60%, and wherein the step of moving the blast gun comprises moving the blast gun at a speed from 10 mm/second to 70 mm/second.

12. A trimming method for a film insert injection molding comprising the steps of:

removing from an injection mold a film insert molding comprising a soft film material having a supported portion adhering integrally to an underlying face of a resin molding, the soft film material having an unsupported portion extending beyond a peripheral edge of the resin molding, aligning a blast gun with the peripheral edge of the resin molding wherein the blast gun is disposed above and faces toward an exposed surface of the film material;

blasting a predetermined concentration of ice slurry from the blast gun towards a vicinity of the peripheral edge of the molding wherein the ice slurry strikes the exposed face of the film material transverse to the exposed face and the underlying face of the resin material; and moving the blast gun sequentially along the outer peripheral edge of the resin molding in order to separate and remove the entire portion of the film material extending beyond the outer peripheral edge of the resin molding, wherein said resin molding supports said film material along the peripheral edge and said unsupported portion of the film material is separated from the supported portion along the length of the peripheral edge by the blasting of the ice slurry against the unsupported portion.

* * * * *